(12) United States Patent
Sawamura et al.

(10) Patent No.: US 10,274,576 B2
(45) Date of Patent: Apr. 30, 2019

(54) SONAR DEVICE, SIGNAL PROCESSING METHOD, AND RECORDING MEDIUM

(71) Applicant: NEC Corporation, Minato-ku, Tokyo (JP)

(72) Inventors: Yasumasa Sawamura, Tokyo (JP); Ryohei Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 15/306,623

(22) PCT Filed: May 14, 2015

(86) PCT No.: PCT/JP2015/002440
§ 371 (c)(1),
(2) Date: Oct. 25, 2016

(87) PCT Pub. No.: WO2015/177990
PCT Pub. Date: Nov. 26, 2015

(65) Prior Publication Data
US 2017/0045604 A1 Feb. 16, 2017

(30) Foreign Application Priority Data
May 19, 2014 (JP) .................................. 2014-103101

(51) Int. Cl.
*G01S 3/00* (2006.01)
*G01S 3/86* (2006.01)
(Continued)

(52) U.S. Cl.
CPC ................ *G01S 3/86* (2013.01); *G01S 3/802* (2013.01); *G01S 3/803* (2013.01)

(58) Field of Classification Search
CPC ............. G01S 3/86; G01S 3/802; G01S 3/803
See application file for complete search history.

(56) References Cited

U.S. PATENT DOCUMENTS

| 5,457,662 | A | 10/1995 | Forster |
| 2006/0277571 | A1* | 12/2006 | Marks .................... A63F 13/00 725/37 |
| 2010/0214086 | A1* | 8/2010 | Yoshizawa .............. G01S 3/801 340/435 |

FOREIGN PATENT DOCUMENTS

| JP | H08-184660 A | 7/1996 |
| JP | H10-177066 A | 6/1998 |

(Continued)

OTHER PUBLICATIONS

Masanori Kato et al., "Noise Suppression With High Speech Quality Based on Weighted Noise Estimation and MMSE STSA", The IEICE Transactions, Jul. 2004, vol. J87-A No. 7.

(Continued)

*Primary Examiner* — Hovhannes Baghdasaryan

(57) ABSTRACT

Provided are a sonar device, signal processing method, and recording medium which contribute to improvement in target signal detection ability of an operator. The sonar device comprises a signal detection processing unit and a noise suppression processing unit. The signal detection processing unit calculates a direction vector for each frequency cell and also calculates a resultant vector direction obtained by summing up the direction vectors of all the frequency cells. The noise suppression processing unit calculates, for each frequency cell, the difference between the resultant vector orientation and the signal direction of the frequency cell, and performs a first noise suppression process for suppressing stationary noises included in a received signal such that the noise suppression effect be smaller on a signal of a frequency cell whose signal direction has a smaller difference from the resultant vector direction, and be larger on a signal of a frequency cell whose signal direction has a larger difference from the resultant vector direction.

20 Claims, 5 Drawing Sheets

(51) Int. Cl.
  *G01S 3/803* (2006.01)
  *G01S 3/802* (2006.01)

(56) References Cited

FOREIGN PATENT DOCUMENTS

| | | |
|---|---|---|
| JP | H11-052038 A | 2/1999 |
| JP | 2009-150662 A | 7/2009 |
| JP | 2010-139330 A | 6/2010 |
| JP | 2010-169644 A | 8/2010 |
| JP | 2011-244275 A | 12/2011 |
| JP | 2012-208062 A | 10/2012 |
| JP | 2014-032081 A | 2/2014 |
| WO | 2011/148860 A1 | 12/2011 |

OTHER PUBLICATIONS

International Search Report for PCT Application No. PCT/JP2015/002440, dated Jul. 28, 2015.
English translation of Written opinion for PCT Application No. PCT/JP2015/002440.
Japanese Office Action for JP Application No. 2016-520921 dated Sep. 12, 2017 with English Translation.

* cited by examiner

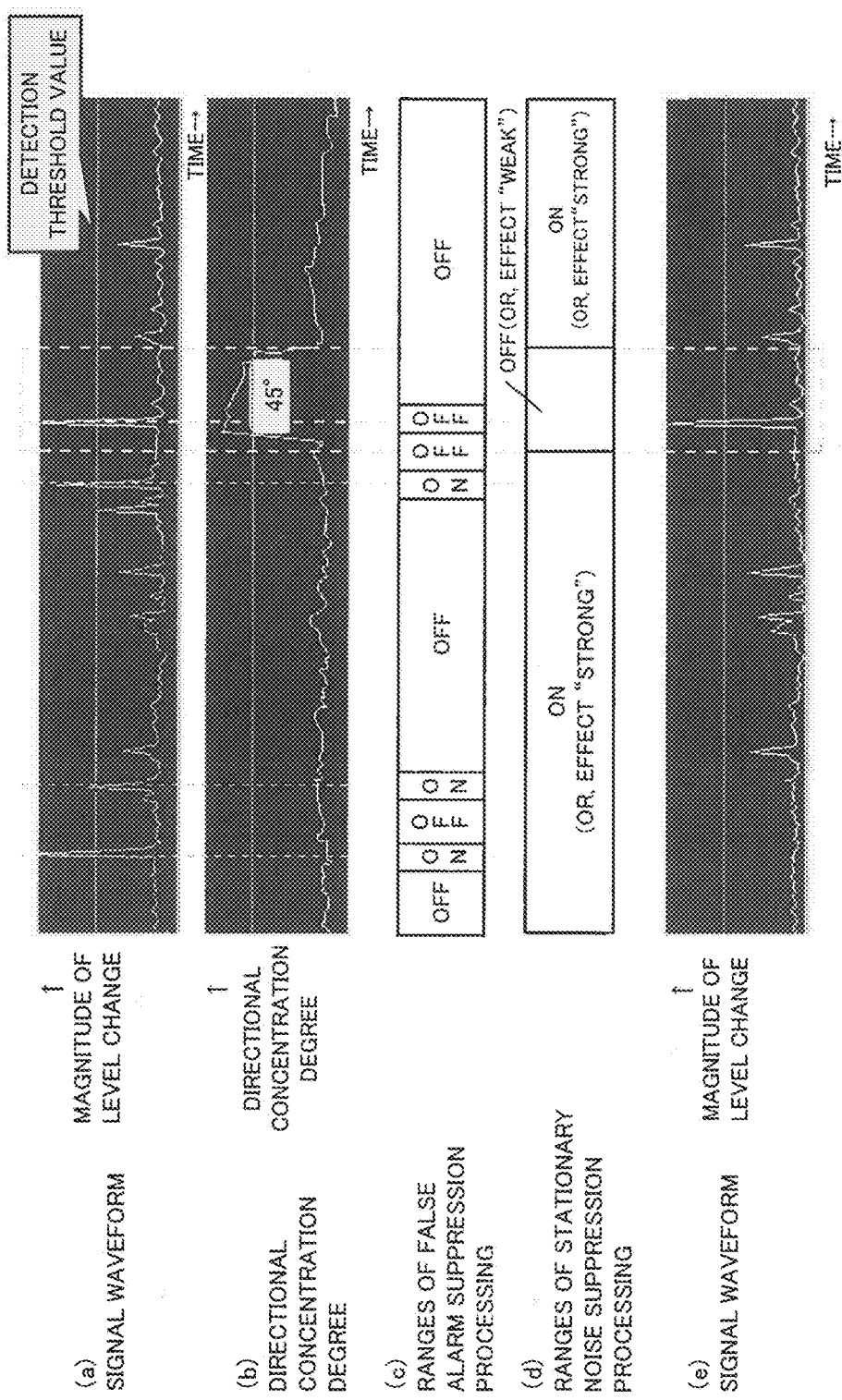

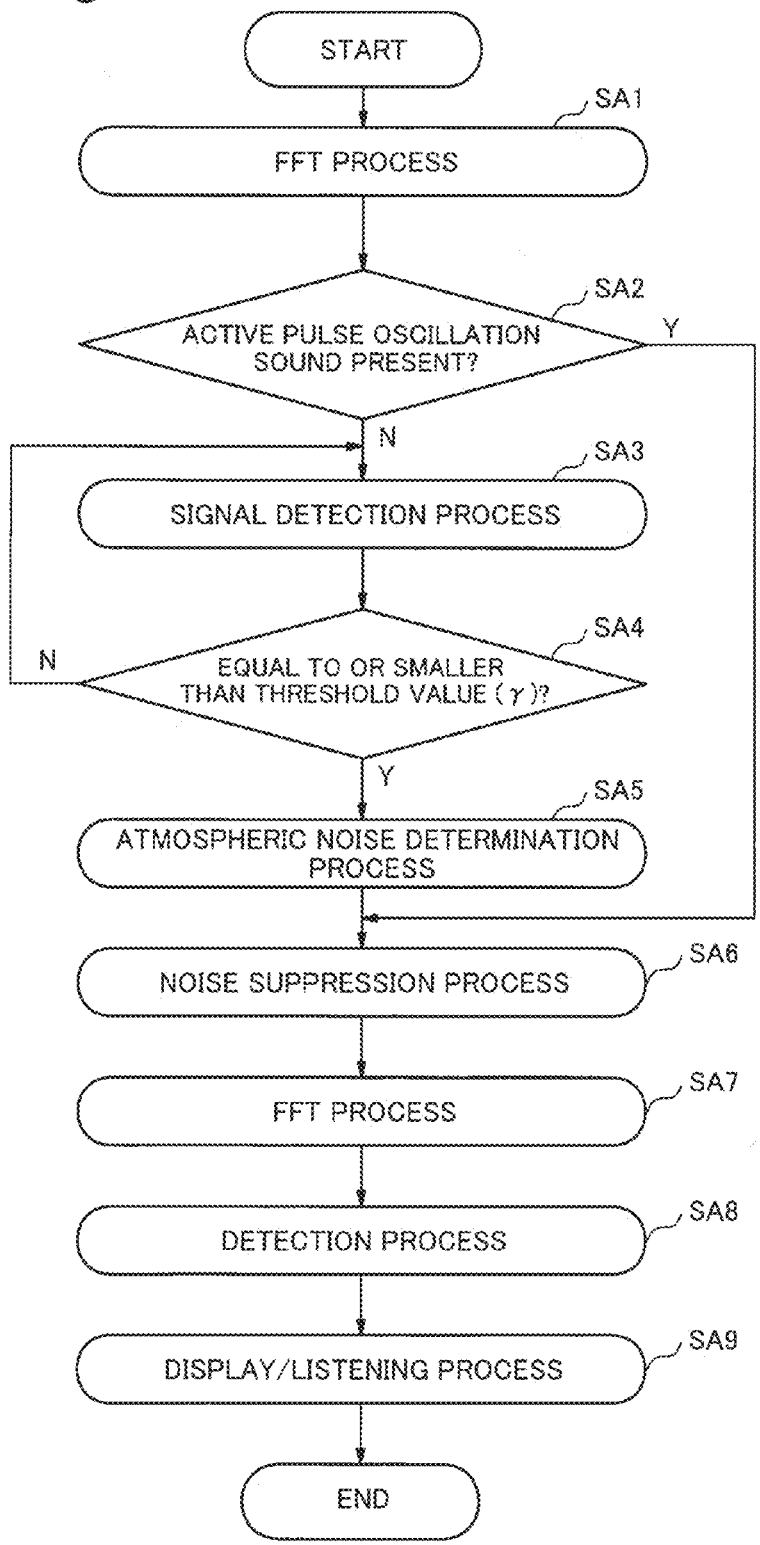

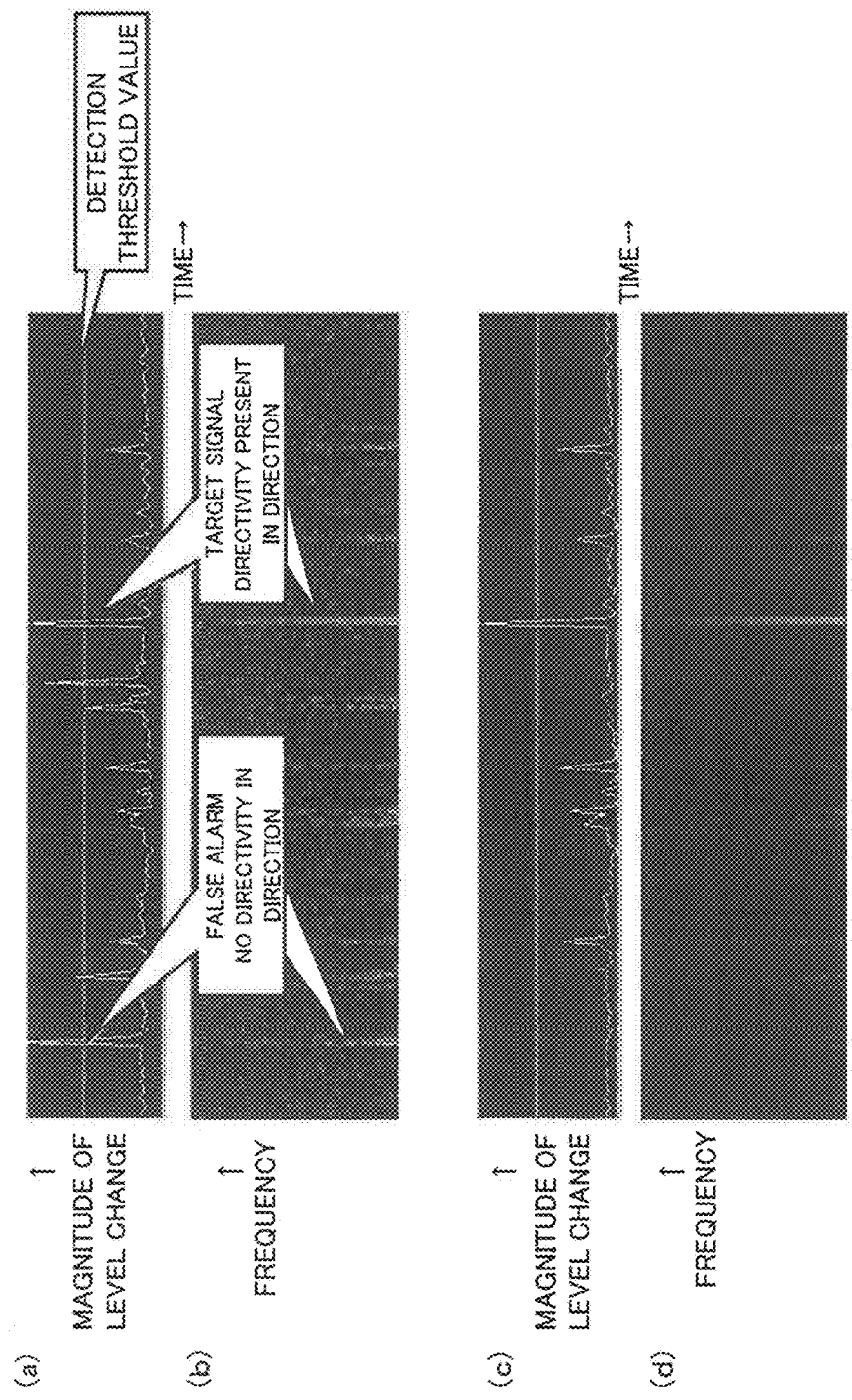

SONAR DEVICE, SIGNAL PROCESSING METHOD, AND RECORDING MEDIUM

This application is a National Stage Entry of PCT/JP2015/002440 filed on May 14, 2015, which claims priority from Japanese Patent Application 2014-103101 filed on May 19, 2014, the contents of all of which are incorporated herein by reference, in their entirety.

TECHNICAL FIELD

The present invention relates to a sonar device, a signal processing method of the sonar device, and a recording medium storing a program for implementing the signal processing method by a computer.

BACKGROUND ART

Generally, sonar devices are classified roughly into active sonar devices and passive sonar devices.

The active sonar devices are devices which emit a sound wave into the water and detects a reflected sound from a target (for example, a ship, a submarine, an underwater mine, and the like), thereby measuring the distance to the target and the location (direction) of the target from, respectively, the time difference between the emitted and reflected sounds and the direction in which the reflected sound is detected.

The passive sonar devices are devices which capture a sound wave emitted by a target to be the monitoring subject, which is present in or on the water, thereby detecting the existence and location (direction) of the target.

Sounds emitted by such a target include a stationary sound lasting for a relatively long period of time, whose emission source is an engine or the like, and a transient sound which is not continuous in time or lasts for only a short period of time, such as a steering sound and a sound of opening or closing a hatch.

Further, sounds in the water include not only the above-mentioned ones emitted by a target but also noises emitted by innumerable sound sources other than the target. Such noises can be categorized into stationary noises and transient noises, where the stationary noises include, for example, a sound caused by the rain, and the transient noises include, for example, a sound originating from an aquatic organism, atmospheric noises and the like. The atmospheric noises are electromagnetic wave noises caused by lightning or the like.

The passive sonar devices convert a received sound, including a sound emitted by a target and noises, into an electrical signal (analog signal) and, after performing predetermined preprocessing on the electrical signal, convert it from an analog signal into a digital signal. The preprocessing includes, for example, signal amplification, filtering and the like. The received signal (RAW signal) having been converted into a digital signal is further subjected to predetermined signal processing, and is subsequently displayed at a display section and also reproduced as a sound by a listening section.

From the image displayed at the display section and the sound reproduced by the listening section, an operator of the passive sonar device determines the presence or absence of a target signal corresponding to a sound emitted by the target. In that case, the operator needs to detect a target signal from the received signal including a large number of noises. Therefore, to assist the target signal detection by the operator, the passive sonar devices perform signal processing for analyzing the received signal and thereby discriminating between the target signal and the noises, and for removing (suppressing) the noises.

As analysis methods of such a received signal, there are known a method of performing frequency analysis of the received signal by the use of Fast Fourier Transform (FFT) or the like, and a method of performing power analysis by detecting the level of the received signal.

For the frequency analysis, for example, used is a well-known Short-time FFT which calculates variation with time of a signal's frequency spectrum by cutting out a signal segment with a constant interval in the direction of the temporal axis, then performing Fourier Transform on the signal segment, and repeating the transformation with the time period of a signal segment to be cut out being shifted. The power analysis is used for extraction of a transient signal corresponding to a transient sound emitted by the target or to a transient noise.

Generally, it is known that transient noises originating from an aquatic organism are generated in a low frequency range. Therefore, the transient noises originating from an aquatic organism can be removed relatively easily by the use of a bandpass filter or the like. However, noises such as atmospheric noises and an intentionally emitted pulse-shaped oscillation sound (hereafter, referred to as an active pulse oscillation sound) cannot be removed by the use of a filter, because their frequencies cannot be identified or their frequency range overlaps with that of the target signal. An example of such an active pulse oscillation sound is an oscillation sound for target detection which is emitted from an active sonar device arranged in the vicinity of the passive sonar device.

A technology of extracting transient signals from a received signal by using the power analysis and then detecting, from the extracted signals, a transient signal emitted from a target (hereafter, may be referred to as a target transient signal) is described in, for example, Patent Literature 1 (PTL 1). PTL 1 describes a method of discriminating the extracted transient signals into a target signal and noises by the use of a sound discrimination method combining well-known HMM (Hidden Markov Model) and NN (Neural Networks) methods.

Patent Literature 2 (PTL 2) points out a drawback of the power analysis in that a target transient signal cannot be recognized by the power analysis if a large power noise exists outside the band of the target transient signal, and accordingly proposes a technology for overcoming the drawback. PTL 2 describes a technology which performs an FFT process on a received signal, thereby normalizing the signal in terms of each frequency, and also calculates the direction of a sound source from the received signal, and then adds the normalized signal and the direction signal. By performing such a process, it becomes possible to display the amount of change in the level of a transient signal without depending on the frequency characteristics.

While it is an invention relating to a radio wave detection device instead of a sonar device, Patent Literature 3 (PTL 3) describes, as a method for suppressing impulsive noises (atmospheric noises), a method of processing a received signal after dividing it into a plurality of signal segments in terms of predetermined bands.

Patent Literature 4 (PTL 4) proposes a technology for detecting a target signal from received signals, which focuses on that a sound emitted by a sound source (target) present underwater has a high directivity in its arrival direction. PTL 4 describes a technology which calculates the direction vector of a transient signal extracted from a received signal and, if the magnitude of the direction vector (directional concentration degree) is equal to or larger than a preset threshold value, determines the transient signal to be a target signal.

Further, Patent Literature 5 (PTL 5) describes a technology for suppressing noises superimposed on an audio signal in, for example, cellular phones and the like. PTL 5 describes a technology which saves information on noises to be suppressed (noise information) in advance, generates mixed noise information (pseudo noise information) on the basis of a result of analysis of an audio signal including noises, and suppresses the noises using the mixed noise information.

Patent Literature 6 (PTL 6) describes an integration circuit which removes noises from time series data by integrating components of the same frequency, a direction detection circuit as a direction detecting means for calculating a signal direction, a directional variance calculation circuit as a means for calculating from the calculation result a variance d of the signal direction, and a directional variance weighting circuit as a means for applying an enhancive weighting to a signal direction having a small value of the variance d. PTL 6 also describes that sound signals are acoustically outputted from a speaker, and a gray-scale image drawing circuit displays the enhancively weighted signal directions in a gray-scale image on a sonagram.

As a method for improving S/N (Signal to Noise) of audio signals, for example, a technology described in Non-patent Document 1 (NPL 1) will be mentioned. In NPL 1, a method of suppressing background noises (stationary noises) by estimating a noise floor level from the level of an audio signal is shown.

CITATION LIST

[Patent Literature]
[PTL 1]
Japanese Laid-Open Patent Application No. H10-177066
[PTL 2]
Japanese Laid-Open Patent Application No. 2014-032081
[PTL 3]
Japanese Laid-Open Patent Application No. 2011-244275
[PTL 4]
Japanese Laid-Open Patent Application No. 2010-169644
[PTL 5]
Re-publication of PCT International Publication No. 2011-148860
[PTL 6]
Japanese Laid-Open Patent Application No. H08-184660
[NPL 1]
Masanori Kato et al., "Noise suppression with high sound quality based on weighted noise estimation and MMSE STSA method", The IEICE Transactions (Japanese Edition), 2004/7, Vol. J87-A No. 7

SUMMARY OF INVENTION

Technical Problem

In the above-described technology of PTL 1, prior learning using a sufficient number of pieces of sample data is required for improving the accuracy of target signal detection. As a result, the calculation amount needed for a process for discriminating between a target signal and noises becomes large. By contrast, in the technology described in PTL 4, prior learning is not required, unlike the technology described in PTL 1, and only a small calculation amount is needed.

However, both of the technologies described in PTL 1 and PTL 4 are ones for improving the accuracy of target signal detection, but none of them is one for removing (suppressing) noises from a received signal. Therefore, they cannot improve easiness of target signal detection by an operator's viewing and listening (target signal detection ability of the operator).

The above-described technology of PTL 2 makes it easy to recognize variation in the signal level of a received signal, but is not one for improving a method for displaying frequency analysis results or for improving sounds outputted from a listening device. Therefore, the technology described in PTL 2 also is not one which can improve the target signal detection ability of an operator. Further, in the technology described in PTL 2, discrimination between a target signal and noises is difficult, and there is even a possibility of mistakenly detecting a noise as a target signal. Hereafter, mistakenly detecting a noise as a target signal is referred to as "false alarm".

Applying the technology described in PTL 3 or PTL 5 to a passive sonar device, it becomes possible to suppress atmospheric noises included in a received signal. However, the technology described in PTL 3 or PTL 5 has a possibility of suppressing even a target transient signal along with atmospheric noises.

Applying the noise suppression technology described in NPL 1 to a passive sonar device, it becomes possible to reduce background noises (stationary noises) included in a received signal. However, because the technology described in NPL 1 has a possibility of reducing even a stationary or transient sound emitted from a target, it cannot be applied, as it is, to a passive sonar device for detecting a target signal from a received signal.

The present invention has been achieved to solve the above-described problems of the background art, and one of the objectives of the present invention is to provide a sonar device, a signal processing method and a recording medium which contribute to improvement in the target signal detection ability of an operator.

Solution to Problem

To achieve the above objectives, a sonar device according to one aspect of the present invention includes: a signal detection processing unit for dividing a received signal corresponding to an electrical signal including information on the magnitude, frequency and arrival direction of a received sound, into a plurality of cells in the frequency axis direction each constituted by a predetermined frequency range, and calculating a direction vector representing the arrival direction of the received sound for each of the frequency cells, and also calculating a resultant vector obtained by summing up all of the direction vectors of the respective frequency cells, and also a resultant vector direction corresponding to a direction represented by the resultant vector; and a noise suppression processing unit for calculating, for each of the frequency cells, the difference between the resultant vector direction and the signal direction for the frequency cell corresponding to a direction represented by the direction vector calculated for the frequency cell, and performing a predetermined first noise suppression process for suppressing stationary noises included in the received signal such that the noise suppression effect be smaller on a signal of a frequency cell whose signal direction has a smaller difference from the resultant vector direction, and be larger on a signal of a frequency cell whose signal direction has a larger difference from the resultant vector direction.

On the other hand, a signal processing method according to another aspect of the present invention includes: dividing a received signal corresponding to an electrical signal including information on the magnitude, frequency and arrival direction of a received sound, into a plurality of cells in the frequency axis direction each constituted by a predetermined frequency range; calculating a direction vector representing the arrival direction of the received sound for each of the frequency cells, and also calculating a resultant vector obtained by summing up all of the direction vectors of the respective frequency cells, and also a resultant vector direction corresponding to a direction represented by the resultant vector; calculating, for each of the frequency cells, the difference between the resultant vector direction and the signal direction for the frequency cell corresponding to a direction represented by the direction vector calculated for the frequency cell; and performing a predetermined first noise suppression process for suppressing stationary noises included in the received signal such that the noise suppression effect be smaller on a signal of a frequency cell whose signal direction has a smaller difference from the resultant vector direction, and be larger on a signal of a frequency cell whose signal direction has a larger difference from the resultant vector direction.

Further, a non-transitory recording medium according to still another aspect of the present invention storing a program for causing a computer to execute processes for: dividing a received signal corresponding to an electrical signal including information on the magnitude, frequency and arrival direction of a received sound, into a plurality of cells in the frequency axis direction each constituted by a predetermined frequency range; calculating a direction vector representing the arrival direction of the received sound, for each of the frequency cells; calculating a resultant vector obtained by summing up all of the direction vectors of the respective frequency cells, and also a resultant vector direction corresponding to a direction represented by the resultant vector; calculating, for each of the frequency cells, the difference between the resultant vector direction and the signal direction for the frequency cell corresponding to a direction represented by the direction vector calculated for the frequency cell; and performing a predetermined first noise suppression process for suppressing stationary noises included in the received signal such that the noise suppression effect be smaller on a signal of a frequency cell whose signal direction has a smaller difference from the resultant vector direction, and be larger on a signal of a frequency cell whose signal direction has a larger difference from the resultant vector direction.

Advantageous Effect of Invention

According to the above-described aspects of the present invention, a sonar device contributing to improvement in the target signal detection ability of an operator is provided.

BRIEF DESCRIPTION OF DRAWINGS

FIG. 4 a flow chart showing an example of a procedure of a signal processing method according to the exemplary embodiment of the present invention FIG. 5 a schematic diagram showing an example of an effect of the exemplary embodiment of the present invention

DESCRIPTION OF EMBODIMENTS

Figure 1:
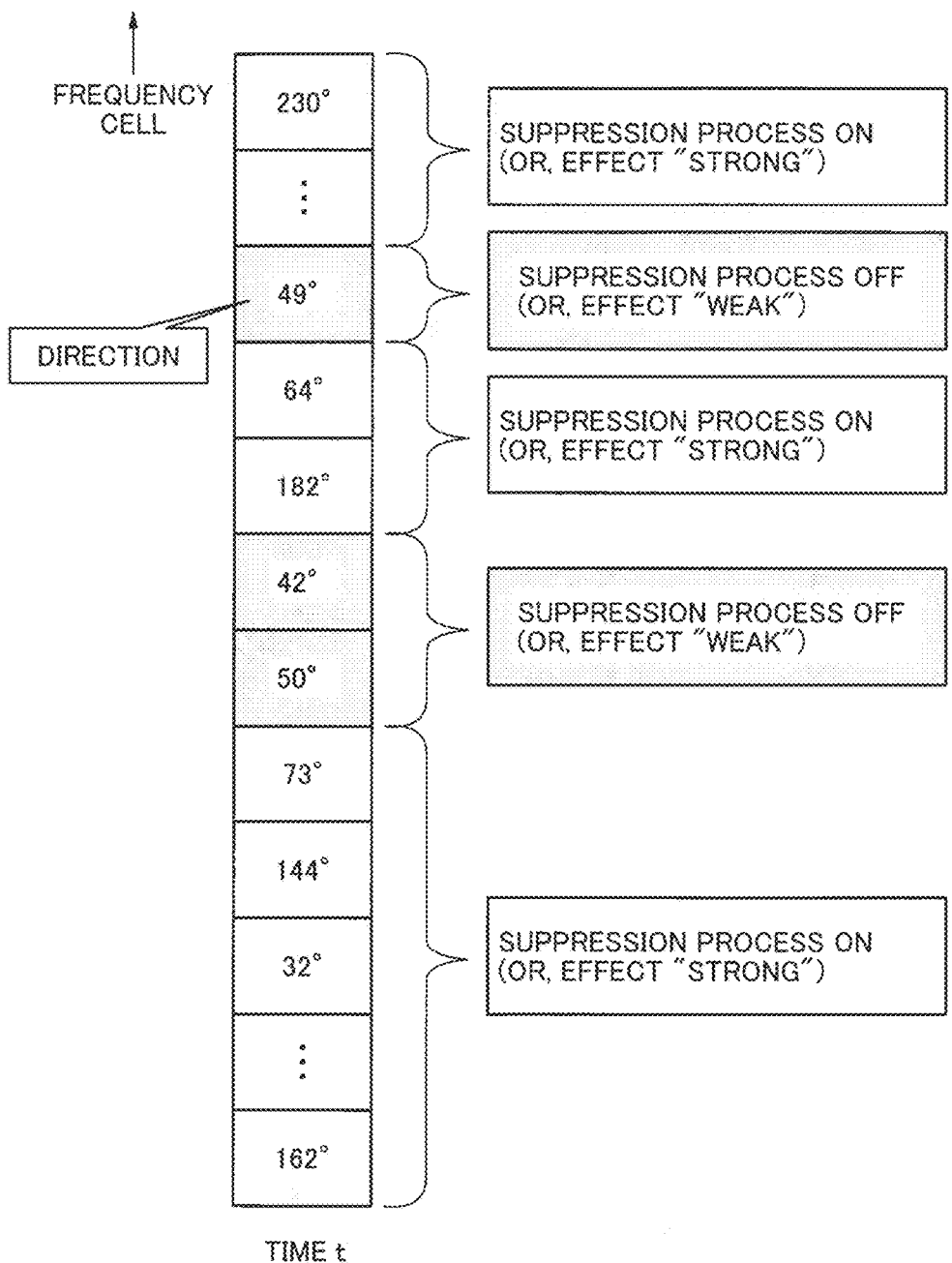
FIG. 1 a schematic diagram showing an example of a stationary noise suppression process in an exemplary embodiment of the present invention FIG. 2 a block diagram showing an example of a configuration of a sonar device according to the exemplary embodiment of the present invention FIG. 3 a schematic diagram showing an example of processing by the noise suppression processing unit shown in FIG. 2

Next, an exemplary embodiment of the present invention will be described using drawings.

In the present exemplary embodiment, by performing processes of three stages shown below as (1) to (3), noises included in a received signal are suppressed while inhibiting generation of a false alarm and, from the received signal after the noise suppression, a target signal is detected.

(1) Using the nature of atmospheric noises and active pulse oscillation sounds, a signal corresponding to an atmospheric noise and that to an active pulse oscillation sound are each detected from a received signal (RAW signal) (false alarm detection process).

(2) The signal of an atmospheric noise (transient noise) detected in the above-described process of (1) is suppressed, and also a signal of a stationary noise is suppressed (noise suppression process). On the active pulse oscillation sound, instead of suppressing the signal of the oscillation sound itself, a false alarm caused by the active pulse oscillation sound is inhibited, as will be described later.

(3) From the RAW signal after the noise suppression in the above-described process of (2), a signal of a level exceeding a preset threshold value is detected as a target signal.

First, the false alarm detection process described above in (1) will be described below.

As mentioned before, an atmospheric noise is generated by mixing of a radio wave noise generated by lightning or the like into a received signal. In many cases, the signal level of such an atmospheric noise is comparable to that of a target signal. However, as described in PTL 3 mentioned above, a sound emitted by a target has directivity, but an atmospheric noise does not. Accordingly, in the present exemplary embodiment, transient signals, including a target signal and atmospheric noises, whose signal level is higher than a preset threshold value ($\gamma$) are extracted, and values indicating directivities of respective ones of the extracted signals are calculated. For the value indicating the directivity, for example, the "directional concentration degree" described in PTL 4 mentioned above may be used. Then, a signal with the value indicating the directivity being equal to or smaller than a preset threshold value is detected as an atmospheric noise (transient noise).

On the other hand, an active pulse oscillation sound is, as mentioned before, an oscillation sound for target detection which is emitted from an active sonar device arranged in the vicinity of the passive sonar device, and generally is an extremely louder sound compared to ambient sounds. Accordingly, when an active pulse oscillation sound is received by a sound sensor (microphone) for converting a received sound into an electrical signal, signal output from the sound sensor saturates at the frequency of the active pulse oscillation sound. On the contrary, in other frequency ranges, the output level from the sound sensor becomes very small, because the sound energy concentrates at the frequency of the active pulse oscillation sound.

Accordingly, in the present exemplary embodiment, a signal of a level equal to or higher than a preset threshold value ($\alpha$) is detected as an active pulse oscillation sound. Alternatively, a sound which has a signal level equal to or lower than a preset threshold value (β) and continues being in the low signal level state for a predetermined time period is detected as an active pulse oscillation sound.

The threshold value (α) is a threshold value to be used when an active pulse oscillation sound is generated at a frequency within the operating frequency band of the sound sensor, and may be set at, for example, the signal saturation level. The threshold value (β) is a threshold value to be used when an active pulse oscillation sound is generated at a frequency outside the operating frequency band of the sound sensor, and may be set, for example, at a value slightly larger than zero.

Here, when the frequency of an active pulse oscillation sound is already known, a most suitable threshold value may be used according to whether or not the frequency is present within the operating frequency band of the sound sensor. When the frequency of an active pulse oscillation sound is not known, an active pulse oscillation sound may be detected by comparing the level of a received signal with the threshold values (α) and (β).

As described above, in a time period where an active pulse oscillation sound is generated, the signal level at frequencies other than that of the oscillation sound becomes very small. On the other hand, in other time periods than the above-mentioned one, the signal level suddenly changes at a time of the start or end of the oscillation sound, because of the existence of stationary noises or the like. Accordingly, when some signal processing method is employed in the sonar device, the level change may be detected as a transient signal.

In a time period where an active pulse oscillation sound is generated, the signal of an active pulse oscillation sound, which is a very loud sound, masks other signals including a target signal, noises and the like. That is, in the time period where an active pulse oscillation sound is generated, a target signal, noises and the like cannot be detected. Therefore, a transient signal detected in the time period where an active pulse oscillation sound is generated or that detected just before and after the time period is very likely to be a false alarm. It is the case regardless of whether the active pulse oscillation sound is generated outside or within the operating frequency band of the sound sensor.

Accordingly, in the present exemplary embodiment, on detecting an active pulse oscillation sound, the time period where the oscillation sound has been detected and periods of a certain length before and after the time period are totally set to be an invalid period and, in the invalid period, a signal detection process for detecting a target signal or noises included in a received signal is suspended, except for the preprocessing mentioned before. In that case, even if the signal level suddenly changes at a time of the start or end of an active pulse oscillation sound, the level change is never detected as a transient signal. As a result, it becomes possible to inhibit a false alarm caused by an active pulse oscillation sound.

Here, when an active pulse oscillation sound is generated within the operating frequency band of the sound sensor, a very high level signal is displayed at the display section, and a very loud sound is outputted from the listening section. Accordingly, in the invalid period described above, displaying the active pulse oscillation sound or its reproduction as a sound may be suspended by, for example, not accepting any received signal or not outputting any signal to the display section and the listening section.

Next, the noise suppression process mentioned above in (2) will be described.

In the noise suppression process, first, transient noises (atmospheric noises) detected in the false alarm detection process mentioned above in (1) are suppressed using, for example, the technology described in PTL 5. As a result, it is possible to suppress only the transient noises without suppressing a target transient signal.

Then, after the transient noise suppression, stationary noises included in the received signal are suppressed using, for example, the technology described in PTL 1 mentioned above. At that time, a process described below is additionally performed in order to prevent suppression of a signal corresponding to a stationary or transient sound emitted from a target.

In a sonar device, as described in PTL 4, for example, a sound wave is received using a plurality of types of sound sensors whose directivities are formed to be omnidirectional, north-south directional or east-west directional. Accordingly, a received signal obtained by combining output signals from the sound sensors includes information not only on the magnitudes and frequencies of the received sounds but also on their arrival directions. After being FFT processed in terms of predetermined intervals, the received signal is divided into a plurality of cells in the frequency axis direction each constituted by a predetermined frequency range (hereafter, referred to as frequency cells), and a direction vector representing the arrival direction and magnitude of the received sound is calculated for each of the frequency cells.

Here, as described before, a sound wave emitted from a target (sound source) has a high directivity in its arrival direction. Accordingly, it is considered that a direction (signal direction) represented by the direction vector of a frequency cell corresponding to the frequency of the sound wave indicates the correct arrival direction of the sound wave from the target. However, it is not always the case that the frequency of a sound wave emitted from a target is already known. Accordingly, in the present exemplary embodiment, all direction vectors of the respective frequency cells calculated at a predetermined time t are combined (added) together to obtain a resultant vector. Then, the direction represented by the resultant vector (resultant vector direction) is assumed to be the arrival direction of the sound wave at the time t.

Further, in the present exemplary embodiment, the noise suppression process is performed in terms of each frequency cell such that the noise suppression effect be smaller on a signal of a frequency cell whose signal direction has a smaller difference from the resultant vector direction, and be larger on a signal of a frequency cell whose signal direction has a larger difference from the resultant vector direction. For example, as shown in FIG. 1, no noise suppression process is performed on a signal of a frequency cell whose signal direction is different from the resultant vector direction by a value equal to or smaller than a preset threshold value (suppression process OFF). On the other hand, a predetermined noise suppression process is performed on a signal of a frequency cell whose signal direction is different from the resultant vector direction by a value larger than the preset threshold value (suppression process ON).

By thus performing the process, a signal having a small variance in signal direction among the frequency cells is not suppressed, but a signal having a large variance in signal direction among the frequency cells is suppressed. That is, while inhibiting a target signal having a high directivity in arrival direction from being suppressed, stationary noises (background noises) or the like having a low directivity can be suppressed effectively. FIG. 1 shows an example where the resultant vector direction is 45 degrees, no noise suppression process is performed on a signal of a frequency cell whose signal direction is within a range of 45±10 degrees, and the noise suppression process is performed on a signal of a frequency cell whose signal direction is beyond the range of 45±10 degrees.

Here, it is only required of the noise suppression process to be able to change the suppression effect according to a value of the difference between the resultant vector direction and the signal direction of a frequency cell, and accordingly, the process is not limited to using such a method as that described above which switches the suppression process to ON or OFF states. For example, creating in advance a transform function for changing the suppression effect according to a value of the difference from the resultant vector direction, the suppression effect may be controlled based on the transform function.

The noise suppression methods used here are not limited to the above-mentioned methods described respectively in PTL 5 and NPL 1, but any other well-known methods such as a noise suppression method using a Wiener filter may be used.

Further, by performing, in advance of performing the noise suppression process shown in (2) mentioned above, a well-known directivity composition process with respect to a direction expected to be the arrival direction of a sound wave, the noise suppression process may be performed after thus improving S/N of a received signal.

Next, a configuration and operation of a sonar device according to the present exemplary embodiment will be described using drawings.

Figure 2:
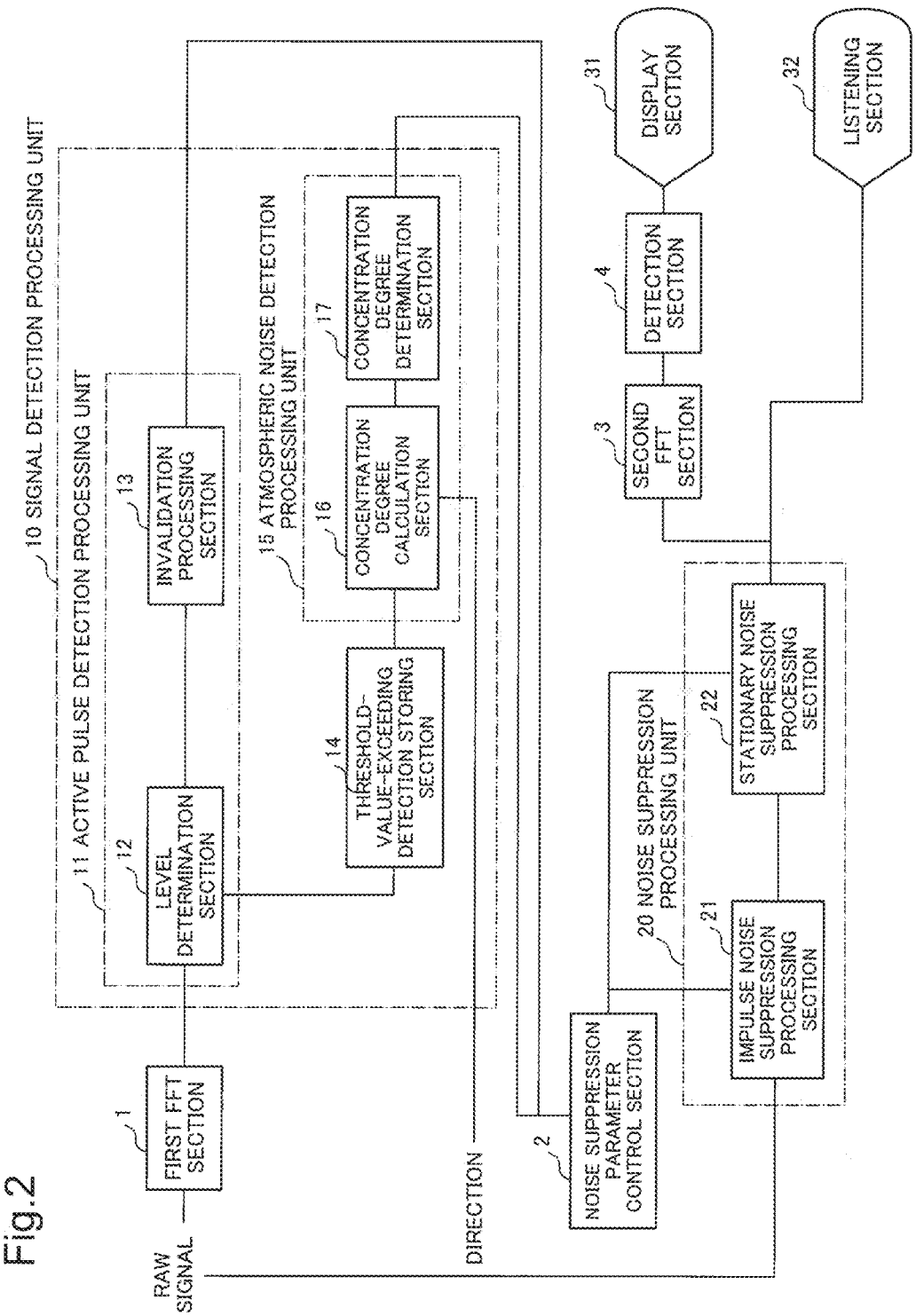

FIG. 2 is a block diagram showing an example of a configuration of the sonar device according to the present exemplary embodiment. The example of a configuration shown in FIG. 2 is that in a case of applying a signal processing method according to the present exemplary embodiment to a passive sonar device.

As shown in FIG. 2, the sonar device comprises a first FFT section 1, a signal detection processing unit 10, a noise suppression parameter control section 2, a noise suppression processing unit 20, a second FFT section 3, a detection section 4, a display section 31 and a listening section 32.

The first FFT section 1, signal detection processing unit 10, noise suppression parameter control section 2, noise suppression processing unit 20, second FFT section 3 and detection section 4, which are illustrated in FIG. 2, may be implemented by, for example, a well-known information processing device (computer). For example, the information processing device has a configuration comprising a nonvolatile memory, a working memory, an A/D (Analog to Digital) converter, a D/A (Digital to Analog) converter, an LSI (Large Scale Integration) consisting of various logical circuits, a DSP (Digital Signal Processor), a CPU (Central Processing Unit) and the like. By the CPU and DSP performing processes according to a predetermined program stored in advance in the nonvolatile memory, the information processing device implements the signal processing method according to the present exemplary embodiment, which will be described later. The program may be stored alternatively in a semiconductor storage device, such as a ROM (Read Only Memory), a RAM (Random Access Memory) and a flash memory, or in a non-transitory recording medium such as an optical disk, a magnetic disk and an MO disk. The display section 31 is implemented by a well-known display device, and the listening section 32 by a well-known speaker.

The signal detection processing unit 10 comprises an active pulse detection processing unit 11, a threshold-value-exceeding detection storing section 14 and an atmospheric noise detection processing unit 15.

The first FFT section 1 performs an FFT process on a received signal (RAW signal) in terms of predetermined intervals, thereby generating a frequency spectrum signal.

The signal detection processing unit 10 detects atmospheric noises and an active pulse oscillation sound included in the frequency spectrum signal, by the false alarm detection process described before. Further, the signal detection processing unit 10 outputs information obtained at a time of the detection of atmospheric noises and an active pulse oscillation sound, such as the above-described directional concentration degree and resultant vector direction, a time at which a target signal was detected (target detection time) and a time at which a false alarm was detected (false alarm detection time).

The active pulse detection processing unit 11 comprises a level determination section 12 and an invalidation processing section 13.

The level determination section 12 detects an active pulse oscillation sound included in the received signal (RAW signal), using preset threshold values ($\alpha$, $\beta$). The level determination section 12 detects a signal of a level equal to or higher than the preset threshold value ($\alpha$) as an active pulse oscillation sound, as described before. It alternatively detects, as an active pulse oscillation sound, a sound which has a signal level equal to or lower than the preset threshold value ($\beta$) and continues being in the low signal level state for a predetermined time period. Further, for the purpose of extracting a target signal and atmospheric noises, the level determination section 12 outputs data on a transient signal of a signal level exceeding a preset threshold value ($\gamma$), to the threshold-value-exceeding detection storing section 14.

The invalidation processing section 13 assigns, to be an invalid period, an X-second period including a time period where the signal level exceeds the threshold value ($\alpha$) or that where the signal level is equal to or lower than the threshold value ($\beta$), which has been detected by the level determination section 12, and additional periods before and after the time period. Then, the invalidation processing section 13 notifies the noise suppression parameter control section 2 of the start and end times of the invalid period. The value of X may be set to be equal to a time longer than that expected as the duration of a transient signal, for example, so as not to detect a change in the signal level at the start or end of an active pulse oscillation sound as the transient signal. In the invalid period, the above-described signal detection process of extracting a target signal and atmospheric noises performed by the level determination section 12 using the threshold value ($\gamma$) is also suspended. Alternatively, a signal detected by the level determination section 12 is invalidated. Here, when an active pulse oscillation sound is generated at a frequency outside the operating frequency band of the sound sensor, the invalidation processing section 13 does not need to notify the noise suppression parameter control section 2 of the start and end times of the invalid period.

The threshold-value-exceeding detection storing section 14 stores signal data in a time period where the signal level exceeds the threshold value ($\gamma$), which has been detected by the level determination section 12, and, at a time when the signal level becomes equal to or lower than the threshold value ($\gamma$), it outputs the stored data to the atmospheric noise detection processing unit 15.

The atmospheric noise detection processing unit 15 comprises a concentration degree calculation section 16 and a concentration degree determination section 17.

With respect to each of transient signals exceeding the threshold value ($\gamma$) having been outputted from the threshold-value-exceeding detection storing section 14, the concentration degree calculation section 16 calculates a directional concentration degree at, for example, a time where the signal level is at the maximum (detection peak time). Further, the concentration degree calculation section 16 calculates a resultant vector direction, in addition to the directional concentration degrees, and outputs all of them to the noise suppression parameter control section 2. Direction vectors for respective frequency cells and the resultant vector direction may be calculated by the concentration degree calculation section 16, or may be calculated by a target signal detecting device, which is not illustrated, and then provided to the concentration degree calculation section 16. A configuration of such a target signal detecting device and its processing are described in PTL 4 mentioned before.

Comparing each of the directional concentration degrees calculated by the concentration degree calculation section 16 with the preset threshold value, the concentration degree determination section 17 determines a signal larger than the threshold value to be a target signal and a signal smaller than the threshold value to be an atmospheric noise. The concentration degree determination section 17 notifies the noise suppression parameter control section 2 of the determination result including a time at which a target signal was detected (target detection time) and a time at which an atmospheric noise was detected (false alarm detection time).

While the above description has been given of an example where discrimination between a target signal and atmospheric noises is performed using their directional concentration degrees, the discrimination between a target signal and atmospheric noises may also be performed using, for example, well-known phase error variance, instead of the directional concentration degrees. In that case, a signal to be discriminated may be determined to be an atmospheric noise if the phases with respect to the signal are distributed in a wide range, and the signal may be determined to be a target signal if the phases are concentrated in a certain range. A calculation method of phase error variance is described in, for example, Japanese Laid-Open Patent Application No. 2002-107446.

Based on the information outputted from the signal detection processing unit 10, including the determination result, the target detection time, the false alarm detection time and the like, the noise suppression parameter control section 2 outputs various parameters for noise suppression to the noise suppression processing unit 20. As mentioned before, the parameters for suppressing a transient noise (atmospheric noise) may be created using, for example, the technology described in PTL 5. The parameters for suppressing a stationary noise may be created using, for example, the technology described in NPL 1. Further, the noise suppression parameter control section 2 outputs information (parameters) for changing the noise suppression effect in terms of each frequency cell when performing the suppression process on a stationary noise, to the noise suppression processing unit 20. Furthermore, the noise suppression parameter control section 2 notifies the noise suppression processing unit 20 of the start and end times of the invalid period which were notified from the invalidation processing section 13.

Using the various parameters provided from the noise suppression parameter control section 2, the noise suppression processing unit 20 suppresses transient noises (atmospheric noises) and stationary noises included in the RAW signal, and outputs the RAW signal after the noise suppression.

The noise suppression processing unit 20 comprises an impulse noise suppression processing section 21 and a stationary noise suppression processing section 22. The impulse noise suppression processing section 21 suppresses transient noises included in the RAW signal by the noise suppression process for suppressing a transient noise (second noise suppression process). The stationary noise suppression processing section 22 suppresses stationary noises included in the RAW signal by the noise suppression process for suppressing a stationary noise (first noise suppression process).

Here, when displaying of an active pulse oscillation sound and its audio reproduction are suspended in the above-mentioned invalid period, the noise suppression processing unit 20 may suspend accepting signal input or outputting a signal, based on the above-mentioned information on the start and end times of the invalid period.

An example of execution of the noise suppression process by the noise suppression processing unit 20 is shown in FIG. 3. FIG. 3 is a schematic diagram showing an example of processing by the noise suppression processing unit shown in FIG. 2.

FIG. 3 (*a*) shows an example of a signal waveform before performing the noise suppression process, and FIG. 3 (*b*) shows variation of the directional concentration degree with respect to the signal shown in FIG. 3 (*a*). FIG. 3 (*c*) shows timings of the suppression process on transient noises detected as false alarms in the signal shown in FIG. 3 (*a*). FIG. 3 (*d*) shows timings of the suppression process on stationary noises in the signal shown in FIG. 3 (*a*). FIG. 3 (*e*) shows the state of a signal waveform after the noise suppression process performed by the noise suppression processing unit.

Here, the vertical axes of FIGS. 3 (*a*) and (*e*) each represent the signal level (magnitude of the level change), and the vertical axis of FIG. 3 (*b*) represents the value of directional concentration degree. The horizontal axes of FIG. 3 (*a*) to (*e*) each represent time. In FIGS. 3 (*c*) and (*d*), ON periods each represent a period where the noise suppression process is performed, and OFF periods each represent a period where the noise suppression process is not performed.

The received signal after the noise suppression outputted from the noise suppression processing unit 20 is converted into a frequency spectrum signal by the second FFT section 3, and then a target signal is detected by the detection section 4. The detection section 4 may determine a signal of a signal level exceeding the preset threshold value ($\gamma$) to be a target signal. In that case, because the detection section 4 determines the presence or absence of a target signal by using the RAW signal after the noise suppression, it can perform the target signal detection more precisely.

The display section 31 displays an image representing a result of the signal processing outputted from the detection section 4.

The listening section 32 converts the RAW signal after the noise suppression outputted from the noise suppression processing unit 20 into an analog signal, and reproduces the converted signal as a sound after amplifying it.

FIG. 4 is a flow chart showing an example of a procedure of the signal processing method according to the present exemplary embodiment.

As shown in FIG. 4, a received signal (RAW signal) received by a sound sensor, which is not illustrated, and then subjected to a predetermined preprocessing is converted into a frequency spectrum signal by an FFT process performed by the first FFT section 1 (step SA1). The frequency spectrum signal outputted from the first FFT section 1 is inputted to the level determination section 12.

The level determination section 12 determines whether or not any active pulse oscillation sound is included in the received signal, using the preset threshold values ($\alpha$, $\beta$) (step SA2). If detecting an active pulse oscillation sound, the level determination section 12 notifies the invalidation processing section 13 of the detection result. The invalidation processing section 13 assigns, to be an invalid period, an X-second period including a time period where the signal level exceeds the threshold value ($\alpha$) or that where the signal level is equal to or lower than the threshold value ($\beta$), which has been notified from the level determination section 12, and additional periods before and after the time period. Then, the invalidation processing section 13 causes the signal detection process by the level determination section 12 during the invalid period to be suspended, or invalidates any signal detected by the level determination section 12 during the invalid period.

Further, the invalidation processing section 13 notifies the noise suppression parameter control section 2 of the start and end times of the invalid period. In the present case, making transition to a process of step SA6, the noise suppression parameter control section 2 makes the noise suppression processing unit 20 suspend accepting any signal input or outputting of a signal during the invalid period.

In a time period where no active pulse oscillation sound is detected, the level determination section 12 extracts a target signal and atmospheric noises from the received signal, using the preset threshold value ($\gamma$) (step SA3). In the present case, if the level of the received signal exceeds the preset threshold value ($\gamma$), the level determination section 12 stores the signal data into the threshold-value-exceeding detection storing section 14. Subsequently, the level determination section 12 determines whether or not the level of the received signal has become equal to or lower than the threshold value ($\gamma$) (step SA4) and, if not, returning to the step SA3, the level determination section 12 repeats the processes of the steps SA3 and SA4. If the level of the received signal has become equal to or lower than the threshold value ($\gamma$), the level determination section 12 causes signal data stored in the threshold-value-exceeding detection storing section 14 to be outputted to the concentration degree calculation section 16.

Based on the data outputted from the threshold-value-exceeding detection storing section 14, the concentration degree calculation section 16 calculates the directional concentration degree of each frequency cell at, for example, the detection peak time, and subsequently, based on the directional concentration degrees, the concentration degree determination section 17 determines whether the received signal is a target signal or an atmospheric noise (step SA5).

Based on the determination result outputted from the signal detection processing unit 10, the noise suppression parameter control section 2 provides the noise suppression processing unit 20 with parameters for noise suppression. Using the parameters received from the noise suppression parameter control section 2, the noise suppression processing unit 20 performs the above-described noise suppression process on the received signal (RAW signal) (step SA6).

On the RAW signal after the noise suppression, the second FFT section 3 performs an FFT process, thereby outputting a frequency spectrum signal (step SA7).

From the frequency spectrum signal outputted from the second FFT section 3, the detection section 4 detects a target signal (step SA8).

The display section 31 displays an image representing the signal processing result, and the listening section 32 reproduces the RAW signal after the noise suppression as a sound (step SA9).

FIG. 5 is a schematic diagram showing an example of an effect of the present exemplary embodiment. FIG. 5 (a) shows an example of a signal waveform before applying the signal processing of the present exemplary embodiment, and FIG. 5 (b) shows an example of a spectrogram of the signal shown in FIG. 5 (a). FIG. 5 (c) shows an example of a signal waveform after applying the signal processing of the present exemplary embodiment, and FIG. 5 (d) shows an example of a spectrogram of the signal shown in FIG. 5 (c). The vertical axes of FIGS. 5 (a) and (c) represent the signal level (magnitude of the level change), and those of FIGS. 5 (b) and (d) represent the frequency. The horizontal axes of FIG. 5 (a) to (d) each represent time.

As described above, in the present exemplary embodiment, with respect to a transient signal with its signal level exceeding the threshold value ($\gamma$), values representing its directivity in arrival direction (directional concentration degrees) are calculated, and accordingly, a signal determined to have no directivity in arrival direction is suppressed. In the example shown in FIG. 5 (a), each of transient signals having exceeded the detection threshold value before detecting a target signal are to be subjected to suppression. In FIG. 5 (c), it can be noticed that, in that case, the transient signals have been suppressed as a result of applying the signal processing method of the present exemplary embodiment. Further, in the signal waveform shown in FIG. 5 (c), it can be noticed that the levels of the background noises have been reduced, compared to those in the signal waveform shown in FIG. 5 (a), by the effect of suppressing the stationary noises, and that, by contrast, the level of the target signal has not been reduced.

According to the present exemplary embodiment, in the process of suppressing stationary noises, the noise suppression process is performed such that the noise suppression effect be smaller on a signal of a frequency cell whose signal direction has a smaller difference from the resultant vector direction, and be larger on a frequency cell whose signal direction has a larger difference from the resultant vector direction. As a result, stationary noises (background noises) can be suppressed effectively, while inhibiting suppression of a target signal.

Further, in the present exemplary embodiment, signals corresponding to atmospheric noises are detected from a received signal by using the nature of atmospheric noises, and then are suppressed. As a result, it becomes possible to suppress only atmospheric noises (transient noises) without suppressing a target transient signal.

Furthermore, in the present exemplary embodiment, a time period where an active pulse oscillation sound is generated is detected from a received signal by using the nature of the active pulse oscillation sound, the time period and certain time periods before and after the time period are totally set to be an invalid period and, in the invalid period, the signal detection process is suspended, As a result, a false alarm caused by an active pulse oscillation sound can be inhibited.

Accordingly, while inhibiting generation of a false alarm and not suppressing a target signal, the level of stationary noises (background noises) can be reduced. As a result, a passive sonar device contributing to improvement in the target signal detection ability of an operator by viewing and listening can be achieved.

The present exemplary embodiment can be applied to not only such a passive sonar device as described above but also any other signal processing devices treating a signal containing information on the signal arrival direction as a subject of its processing. As such devices, an active sonar device, a sound collection device for collecting and processing sounds arriving from a plurality of directions and the like will be mentioned.

The present invention has been described above with reference to the exemplary embodiment, but the present invention is not limited to the above-described exemplary embodiment. To the configurations and details of the present invention, various changes which can be understood by those skilled in the art may be made within the scope of the present invention This application is based upon and claims the benefit of priority from Japanese Patent Application No. 2014-103101, filed on May 19, 2014, the disclosure of which is incorporated herein in its entirety by reference.

REFERENCE SIGNS LIST 1 first FFT section
2 noise suppression parameter control section
3 second FFT section
4 detection section
10 signal detection processing unit
11 active pulse detection processing unit
12 level determination section
13 invalidation processing section
14 threshold-value-exceeding detection storing section
15 atmospheric noise detection processing unit
16 concentration degree calculation section
17 concentration degree determination section
20 noise suppression processing unit
21 impulse noise suppression processing section
22 stationary noise suppression processing section
31 display section
32 listening section

What is claimed is:

1. A sonar device comprising: a signal detection processing unit configured to divide a received signal using a plurality of types of sound sensors whose directivities are formed to be omnidirectional, north-south directional or east-west directional, into a plurality of cells in the frequency axis direction each constituted by a predetermined frequency range, and calculate a direction vector representing the arrival direction of the received sound for each of the frequency cells, and also calculate a resultant vector obtained by summing up all of the direction vectors of the respective frequency cells, and also a resultant vector direction corresponding to a direction represented by the resultant vector; and a noise suppression processing unit configured to calculate, for each of the frequency cells, the difference between the resultant vector direction and a signal direction for the frequency cell corresponding to a direction represented by the direction vector calculated for the frequency cell, and perform a first noise suppression process configured to suppress stationary noises included in the received signal such that the noise suppression effect be smaller on a signal of a frequency cell whose signal direction has a smaller difference from the resultant vector direction, and be larger on a signal of a frequency cell whose signal direction has a larger difference from the resultant vector direction.

2. The sonar device according to claim 1, wherein the noise suppression processing unit does not perform the first noise suppression process on a signal of a frequency cell whose signal direction is different from the resultant vector direction by a value equal to or smaller than a first threshold value, and does perform the first noise suppression process on a signal of a frequency cell whose signal direction is different from the resultant vector direction by a value exceeding the first threshold value.

3. The sonar device according to claim 1, wherein:
the signal detection unit extracts, from the received signal, a transient signal of a signal level higher than a preset second threshold value, calculates values representing directivities of respective ones of the extracted transient signals and detects, as a transient noise, a transient signal with the value representing its directivity being equal to or smaller than a preset third threshold value; and
on the transient noise detected by the signal detection unit, the noise suppression processing unit performs a predetermined second noise suppression process for suppressing the transient noise.

4. The sonar device according to claim 1, wherein the signal detection unit
detects, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time,
sets, to be an invalid period, the generation period of active pulse oscillation sound and periods of a preset length before and after the generation period, and
suspends, during the invalid period, a signal detection process for detecting a target signal corresponding to a sound wave emitted by a target to be a monitoring subject and then included in the received signal, or detecting noises included in the received signal.

5. A signal processing method comprising: dividing a received signal corresponding to received signal using a plurality of types of sound sensors whose directivities are formed to be omnidirectional, north-south directional or east-west directional, into a plurality of cells in the frequency axis direction each constituted by a predetermined frequency range; calculating a direction vector representing the arrival direction of the received sound for each of the frequency cells, and also calculating a resultant vector obtained by summing up all of the direction vectors of the respective frequency cells, and also a resultant vector direction corresponding to a direction represented by the resultant vector; calculating, for each of the frequency cells, the difference between the resultant vector direction and a signal direction for the frequency cell corresponding to a direction represented by the direction vector calculated for the frequency cell; and performing a first noise suppression process configured to suppress stationary noises included in the received signal such that the noise suppression effect be smaller on a signal of a frequency cell whose signal direction has a smaller difference from the resultant vector direction, and be larger on a signal of a frequency cell whose signal direction has a larger difference from the resultant vector direction.

6. The signal processing method according to claim 5, wherein
the first noise suppression process is not performed on a signal of a frequency cell whose signal direction is different from the resultant vector direction by a value equal to or smaller than a first threshold value, and is performed on a signal of a frequency cell whose signal direction is different from the resultant vector direction by a value exceeding the first threshold value.

7. The signal processing method according to claim 5, comprising:
extracting, from the received signal, a transient signal of a signal level higher than a preset second threshold value;
calculating values representing directivities of respective ones of the extracted transient signals; detecting, as a transient noise, a transient signal with the value representing its directivity being equal to or smaller than a preset third threshold value; and
performing, on the transient noise detected by the signal detection unit, a predetermined second noise suppression process for suppressing the transient noise.

8. The signal processing method according to claim 5, comprising:
detecting, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time;
setting, to be an invalid period, the generation period of active pulse oscillation sound and periods of a preset length before and after the generation period; and
suspending, during the invalid period, a signal detection process for detecting a target signal corresponding to a sound wave emitted by a target to be a monitoring subject and then included in the received signal, or detecting noises included in the received signal.

9. A non-transitory recording medium storing a program for causing a computer to execute processes for: dividing a received signal using a plurality of types of sound sensors whose directivities are formed to be omnidirectional, north-south directional or east-west directional, into a plurality of cells in the frequency axis direction each constituted by a predetermined frequency range; calculating a direction vector representing the arrival direction of the received sound, for each of the frequency cells; calculating a resultant vector obtained by summing up all of the direction vectors of the respective frequency cells, and also a resultant vector direction corresponding to a direction represented by the resultant vector; calculating, for each of the frequency cells, the difference between the resultant vector direction and a signal direction for the frequency cell corresponding to a direction represented by the direction vector calculated for the frequency cell; and performing a first noise suppression process configured to suppress stationary noises included in the received signal such that the noise suppression effect be smaller on a signal of a frequency cell whose signal direction has a smaller difference from the resultant vector direction, and be larger on a signal of a frequency cell whose signal direction has a larger difference from the resultant vector direction.

10. The sonar device according to claim 2, wherein:
the signal detection unit extracts, from the received signal, a transient signal of a signal level higher than a preset second threshold value, calculates values representing directivities of respective ones of the extracted transient signals and detects, as a transient noise, a transient signal with the value representing its directivity being equal to or smaller than a preset third threshold value; and
on the transient noise detected by the signal detection unit, the noise suppression processing unit performs a predetermined second noise suppression process for suppressing the transient noise.

11. The sonar device according to claim 2, wherein
the signal detection unit
detects, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time,
sets, to be an invalid period, the generation period of active pulse oscillation sound and periods of a preset length before and after the generation period, and
suspends, during the invalid period, a signal detection process for detecting a target signal corresponding to a sound wave emitted by a target to be a monitoring subject and then included in the received signal, or detecting noises included in the received signal.

12. The sonar device according to claim 3, wherein
the signal detection unit
detects, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time,
sets, to be an invalid period, the generation period of active pulse oscillation sound and periods of a preset length before and after the generation period, and
suspends, during the invalid period, a signal detection process for detecting a target signal corresponding to a sound wave emitted by a target to be a monitoring subject and then included in the received signal, or detecting noises included in the received signal.

13. The sonar device according to claim 10, wherein
the signal detection unit
detects, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time,
sets, to be an invalid period, the generation period of active pulse oscillation sound and periods of a preset length before and after the generation period, and
suspends, during the invalid period, a signal detection process for detecting a target signal corresponding to a sound wave emitted by a target to be a monitoring subject and then included in the received signal, or detecting noises included in the received signal.

14. The signal processing method according to claim 6, comprising:
extracting, from the received signal, a transient signal of a signal level higher than a preset second threshold value;
calculating values representing directivities of respective ones of the extracted transient signals; detecting, as a transient noise, a transient signal with the value representing its directivity being equal to or smaller than a preset third threshold value; and performing, on the transient noise detected by the signal detection unit, a predetermined second noise suppression process for suppressing the transient noise.

15. The signal processing method according to claim 6, comprising:

detecting, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time;

setting, to be an invalid period, the generation period of active pulse oscillation sound and periods of a preset length before and after the generation period; and suspending, during the invalid period, a signal detection process for detecting a target signal corresponding to a sound wave emitted by a target to be a monitoring subject and then included in the received signal, or detecting noises included in the received signal.

16. The signal processing method according to claim 7, comprising:

detecting, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time;

setting, to be an invalid period, the generation period of active pulse oscillation sound and periods of a preset length before and after the generation period; and suspending, during the invalid period, a signal detection process for detecting a target signal corresponding to a sound wave emitted by a target to be a monitoring subject and then included in the received signal, or detecting noises included in the received signal.

17. The signal processing method according to claim 14, comprising:

detecting, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time;

setting, to be an invalid period, the generation period of active pulse oscillation sound and periods of a preset length before and after the generation period; and suspending, during the invalid period, a signal detection process for detecting a target signal corresponding to a sound wave emitted by a target to be a monitoring subject and then included in the received signal, or detecting noises included in the received signal.

18. The non-transitory recording medium according to claim 9, wherein the first noise suppression process is not performed on a signal of a frequency cell whose signal direction is different from the resultant vector direction by a value equal to or smaller than a first threshold value, and is performed on a signal of a frequency cell whose signal direction is different from the resultant vector direction by a value exceeding the first threshold value.

19. The non-transitory recording medium according to claim 9, wherein the program causes the computer to execute processes for:

extracting, from the received signal, a transient signal of a signal level higher than a preset second threshold value;

calculating values representing directivities of respective ones of the extracted transient signals; detecting, as a transient noise, a transient signal with the value representing its directivity being equal to or smaller than a preset third threshold value; and performing, on the transient noise detected by the signal detection unit, a predetermined second noise suppression process for suppressing the transient noise.

20. The non-transitory recording medium according to claim 9, wherein the program causes the computer to execute processes for:

detecting, as a generation period of active pulse oscillation sound, a time period where the signal level of the received signal is equal to or higher than a preset fourth threshold value or a time period where the signal level is equal to or lower than a preset fifth threshold value and the low signal level state lasts for a predetermined time;

setting, to be an invalid period, the generation period of active pulse oscillation sound and periods of a preset length before and after the generation period; and suspending, during the invalid period, a signal detection process for detecting a target signal corresponding to a sound wave emitted by a target to be a monitoring subject and then included in the received signal, or detecting noises included in the received signal.

* * * * *